US010655821B2

(12) United States Patent
Soleimani et al.

(10) Patent No.: US 10,655,821 B2
(45) Date of Patent: May 19, 2020

(54) LED DEVICE HOLDER, LED LIGHTING SYSTEM, AND METHOD OF MANUFACTURE

(71) Applicant: Lumileds LLC, San Jose, CA (US)

(72) Inventors: Nazila Soleimani, San Jose, CA (US); John Michael Cesaratto, San Jose, CA (US); Ronald Johannes Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/414,362

(22) Filed: May 16, 2019

(65) Prior Publication Data

US 2019/0353330 A1 Nov. 21, 2019

Related U.S. Application Data

(60) Provisional application No. 62/673,851, filed on May 18, 2018.

(51) Int. Cl.
| F21V 15/01 | (2006.01) |
| F21K 9/68 | (2016.01) |
| F21K 9/90 | (2016.01) |
| F21V 17/10 | (2006.01) |
| G06F 17/50 | (2006.01) |
| G06F 30/00 | (2020.01) |
| F21V 29/503 | (2015.01) |
| F21Y 115/10 | (2016.01) |
| G06F 30/20 | (2020.01) |
| G06F 119/18 | (2020.01) |

(52) U.S. Cl.
CPC ............... *F21V 15/01* (2013.01); *F21K 9/68* (2016.08); *F21K 9/90* (2013.01); *F21V 17/10* (2013.01); *G06F 30/00* (2020.01); *F21V 29/503* (2015.01); *F21Y 2115/10* (2016.08); *G06F 30/20* (2020.01); *G06F 2119/18* (2020.01)

(58) Field of Classification Search
CPC . F21V 15/01; F21V 17/10; F21K 9/68; F21K 9/90; G06F 17/50
See application file for complete search history.

(56) References Cited

U.S. PATENT DOCUMENTS

| 9,494,298 | B2 | 11/2016 | Shen |
| 2009/0219728 | A1 | 9/2009 | Hata et al. |
| 2010/0148201 | A1 | 6/2010 | Kim et al. |
| 2011/0170298 | A1 | 7/2011 | Anaokar et al. |
| 2012/0287644 | A1 | 11/2012 | Wronski et al. |
| 2013/0258674 | A1 | 10/2013 | Becker et al. |
| 2016/0102848 | A1 | 4/2016 | Stucchi |

(Continued)

FOREIGN PATENT DOCUMENTS

| CN | 101079457 B | 5/2010 |
| CN | 102853300 | 7/2015 |

(Continued)

*Primary Examiner* — Joseph L Williams
(74) *Attorney, Agent, or Firm* — Volpe and Koenig, P.C.

(57) ABSTRACT

An LED device holder, an LED lighting system and a method of manufacturing an LED lighting system are described herein. An LED lighting system includes a holder defining an aperture. The aperture has a perimeter and a fillet adjacent the perimeter. The fillet has a radius greater than or equal to 2.0 mm and less than or equal to 4.6 mm. An LED array is mechanically coupled to the holder. The LED array has a light emitting surface exposed through the aperture.

20 Claims, 13 Drawing Sheets

(56) References Cited

U.S. PATENT DOCUMENTS

| | | |
|---|---|---|
| 2016/0281966 A1 | 9/2016 | Meyer |
| 2016/0320009 A1 | 11/2016 | Vasquez et al. |
| 2018/0145059 A1 | 5/2018 | Welch et al. |

FOREIGN PATENT DOCUMENTS

| | | |
|---|---|---|
| CN | 205137356 | 4/2016 |
| JP | 2006-049807 A | 2/2006 |
| JP | 2008-218484 A | 9/2008 |
| WO | 2010/140729 A1 | 12/2010 |

US 10,655,821 B2

LED DEVICE HOLDER, LED LIGHTING SYSTEM, AND METHOD OF MANUFACTURE

BACKGROUND

Chip-on-Board (COB) is an array architecture that may comprise an array of light emitting elements arranged on a single substrate and covered by an encapsulant within a ring or dam surrounding the light emitting elements. The encapsulant may be a silicone compound that is poured into the dam then cured, or it may be a preformed element, such as a silicone sheet or a ceramic that is contained within the ring. The encapsulant may include a wavelength conversion material that converts wavelengths of light emitted by the light emitting elements to one or more other wavelengths.

SUMMARY

An LED device holder, an LED lighting system and a method of manufacturing an LED lighting system are described herein. An LED lighting system includes a holder defining an aperture. The aperture has a perimeter and a fillet adjacent the perimeter. The fillet has a radius greater than or equal to 2.0 mm and less than or equal to 4.6 mm. An LED array is mechanically coupled to the holder. The LED array has a light emitting surface exposed through the aperture.

DETAILED DESCRIPTION OF THE PREFERRED EMBODIMENTS

Figure 1:
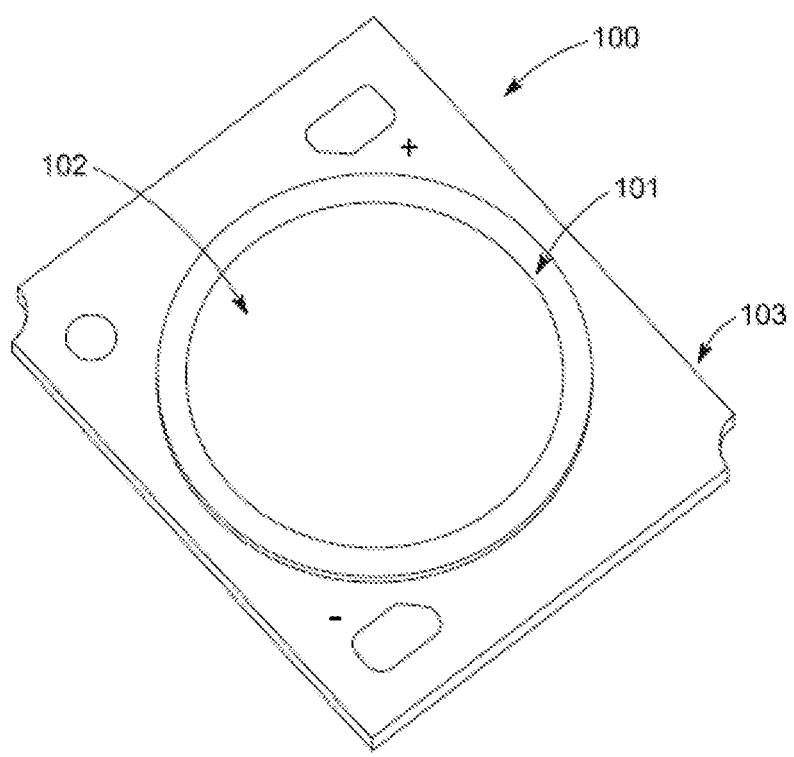
FIG. 1 is a perspective view of an example COB light-emitting diode (LED) device.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

The output from an LED device is generally concentrated, but the distribution may be broad and may, therefore, lack intensity over a distance. As a result, LED lamps and fixtures may incorporate one or more secondary optical elements, such as apertures and reflectors. Secondary optical elements may collect the light, magnify its intensity, direct it to a target surface, and shape the beam of light.

COB LED devices may be desirable due to their flexibility and low cost. However, traditional secondary optical elements, such as industry standard apertures, may reduce the efficiency of an LED system that uses a COB LED device as a light source.

Embodiments described herein provide for secondary optics for LED devices and methods of manufacture that may increase system efficiency. In one embodiment, secondary optics for a COB LED device are described that include at least an aperture with an adjacent fillet that increases system efficiency up to 8%. While an example embodiment is described that is optimized for a particular COB LED, methods are described herein that may be used to optimize a radius of the fillet for various COB LED devices and other non-COB types of LED devices that include densely packed LED arrays.

FIG. 1 is a perspective view of a COB LED device 100. In embodiments, the COB LED device 100 may be used as a light source in an LED lighting system. In the example illustrated in FIG. 1, the COB LED device 100 has an outer perimeter 103. In one embodiment, the outer perimeter 103 is a rectangular shape. However, the outer perimeter 103 may be other shapes, including, but not limited to, a circular or stadium shape. The COB LED device 100 may have a light emitting area 102 that includes an array of light emitting elements. The array of light emitting elements may be arranged on a single substrate and covered by an encapsulant within a ring 101 or other frame structure. In embodiments, the encapsulant may include a wavelength conversion material that converts one or more wavelengths of light emitted by the light emitting elements to one or more other wavelengths of light.

The COB LED device 100 may be any type of COB LED device, such as the LUMILEDS® CoB Gen 3 (e.g., L2C5-22901208E1500) 3610 lm LED (hereinafter Lumileds CoB Gen). The Lumileds CoB Gen has a circular shaped light emitting area with a diameter of approximately 15 mm and a ring having a diameter of approximately 17.3 mm. An example of an LED lighting system is described herein that uses the Lumileds CoB Gen as an example LED device for which the secondary optics in the LED light system are optimized. However, as will be clear, the secondary optics can be optimized, using methods described herein, for any type of LED device with a densely packed LED array. The secondary optics may include, for example, apertures and reflectors that may collect light, magnify its intensity, direct it to the target surface, and shape the beam of light.

Figure 2A:
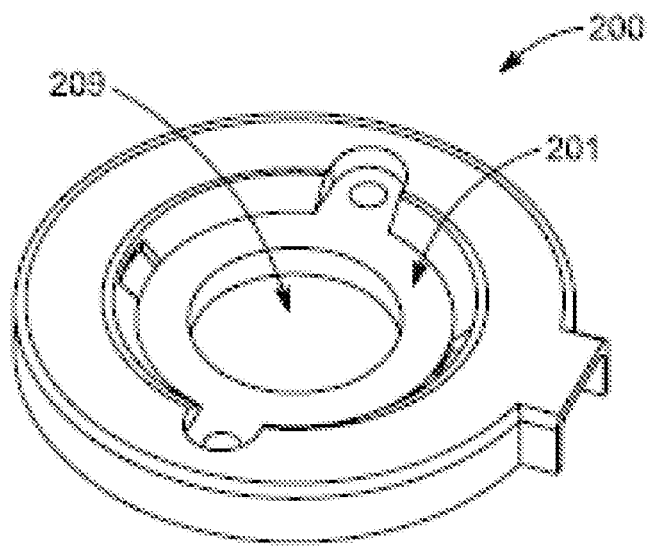
FIG. 2A is a perspective view of an example LED device holder with an inner section defining an aperture.
Figure 2B:
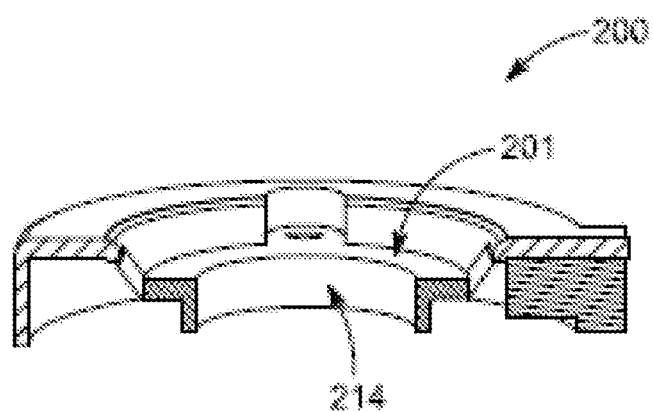
FIG. 2B is a sectional view of the example LED device holder of FIG. 2A.

FIGS. 2A and 2B are diagrams of an example LED device holder 200. The example LED device holder 200 includes an inner section 201 that defines an aperture 209. The inner section 201 of the holder 200 defining the aperture 209 has a defined height and a flat inner surface 214. Given the flat inner surface 214, when the LED device holder 200 is incorporated in an LED lighting system having a COB LED device as the light source, the overall efficiency of the LED lighting system may decrease.

Figure 3A:
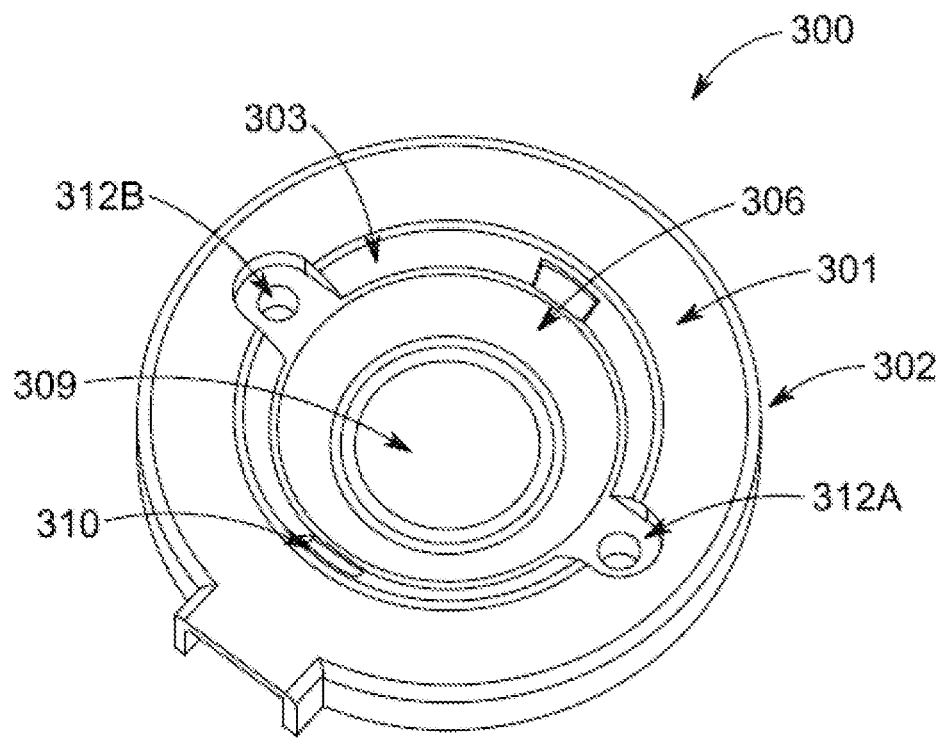
FIG. 3A is a perspective view of another example LED device holder with an inner section defining an aperture.
Figure 3B:
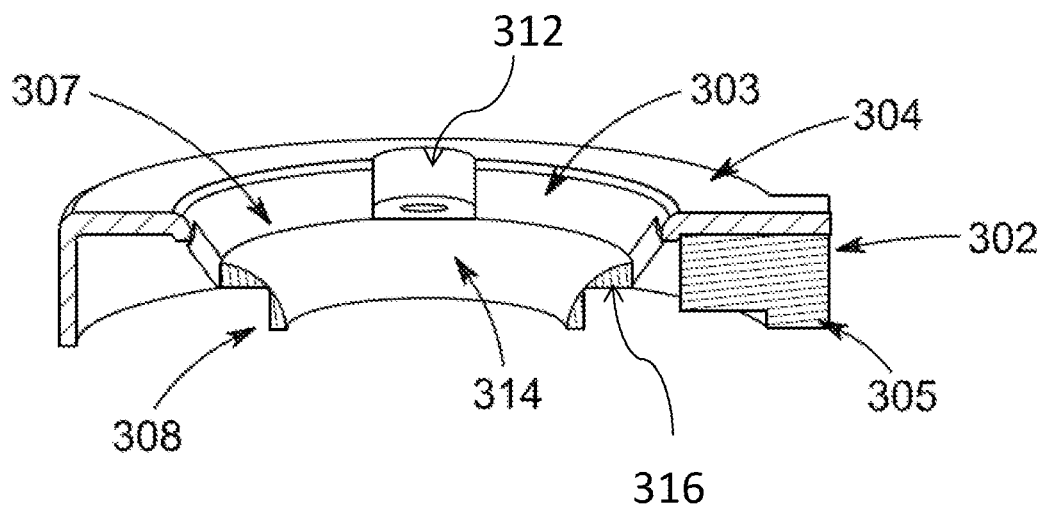
FIG. 3B is a sectional view the example LED device holder of FIG. 3A.

FIGS. 3A and 3B are diagrams of another example LED device holder 300. The example LED device holder 300 illustrated in FIGS. 3A and 3B includes an outer section 301, a bevel portion 303, and an inner section 306. The size and shape of the outer section 301 are defined by an outer wall 302 and a top portion 304. In the illustrated example, the outer wall 302 of the outer section 301 has a cylindrical shape. However, the outer wall 302 of the outer section 301 may be any suitable shape, including, but not limited to, a rectangular shape.

The inner section 306 may have a top portion 307 and a bottom portion 308. In the illustrated example, the top portion 307 of the inner section 306 sits lower than the top portion 304 of the outer section 301. The bottom portion 308 of the inner section 306 defines an aperture 309. In embodiments, the inner section 306 is circular shaped and defines a circular aperture 309. However, the inner section 306 and the aperture 309 may have any suitable shape.

The bevel portion 303 of the holder 300 is situated between the outer section 301 and the inner section 306. The bevel portion 303 mechanically couples the top portion 304 of the outer section 301 and the top portion 307 of the inner section 306 and slopes inward in such a way that allows the top portion 307 of the inner section 306 to sit below the top portion 304 of the outer section 301.

The LED device holder 300 further includes first and second mounts 312A and 312B. The first mount 312A protrudes from a segment of the top portion 307 of the inner section 306 and the second mount 312B is located opposite the first mount 312B and protrudes from another segment of the top portion 307 of the inner section 306. The mounts 312A, 312B each have an opening in which a screw may be inserted. The mounts 312A, 312B may be configured to align with holes in a heat sink or other element (not shown) for attachment. The mounts 312A, 312B may also be configured for securing the LED device holder 300 to a COB or other LED device, such as by being arranged to align with openings or indentations in the COB or other LED device. Accordingly, when the LED device holder 300 is attached to a heat sink or other element by inserting screws into the mounts 312A, 312B, the COB or other LED device may be secured in place and aligned such that the light emitting area is exposed through the aperture 309 in LED device holder 300. While two mounts 312A and 312B are illustrated in FIG. 3A, one or more mounts 312 may be used consistent with the embodiments described herein.

In embodiments where the LED device is a COB LED device, such as the COB LED device illustrated in FIG. 1, a diameter of the aperture 309 may be slightly larger than a diameter of the ring 101 containing the light emitting area 102. In embodiments, the ratio of the diameter of the aperture 309 to the diameter of the ring 101 may approximately 1.1. For example, in a lighting system using the Lumileds CoB Gen as the light source, the light emitting area may have a diameter of approximately 17.3 mm. As such, in such an embodiment, the aperture 309 may have a diameter of approximately 19 mm.

In contrast to the flat inner surface 214 of the inner section 201 of the LED device holder 200 of FIGS. 2A and 2B, the upper portion 307 of the inner section 306 of the LED device holder 300 of FIGS. 3A and 3B has a fillet shape. In embodiments, the fillet shape may have a radius 316 greater than 0.0 mm and equal to or less than 4.6 mm for light emitting areas having diameters greater than or equal to 6.0 mm and less than or equal to 32.0 mm. For the Lumileds CoB Gen device having a mid-range light emitting area diameter of 15.0 mm, the radius 316 of the fillet shape may be optimal at 4.6 mm. For smaller light emitting surface diameters, the optimal radius 316 of the fillet shape may go down to approximately 2.0 mm. For larger light emitting surface diameters, the optimal radius 316 of the fillet shape may be similar to the Lumileds CoB Gen device (e.g., approximately 4.6 mm). The fillet shaped upper surface (also referred to herein as a fillet) may be diffusely or specularly reflective in order to aid in re-directing/re-focusing the light emitted by the COB or other LED device in conjunction with the secondary optics.

In embodiments, the LED device holder 300 may be disposed on top of the COB or other LED device. The COB or other LED device may be sized and configured in such a way that the aperture 309 aligns with the light emitting area of the COB or other LED device. As described above, the COB or other LED device may be secured to the LED device holder 300 when the LED device holder 300 is attached to a heat sink or other element by inserting screws into the mounts 312A, 312B. The COB or other LED device may alternatively or additionally be secured to the LED device holder 300 in other ways. For example, the LED device holder 300 may comprise at least one tab located and sized to mate in a male-female fashion with the COB or other LED device to join the LED device holder 300 and the COB or other LED device.

In embodiments, the aperture 309 may be filled with a polymer to protect the light emitting area of the COB or other LED device. In embodiments, the polymer may be polybutylene terephthalate (PBT) glass. PBT glass is electrically insulating and mechanically strong and may, thereby, provide protection and insulation to the COB or other LED device.

Figure 4A:
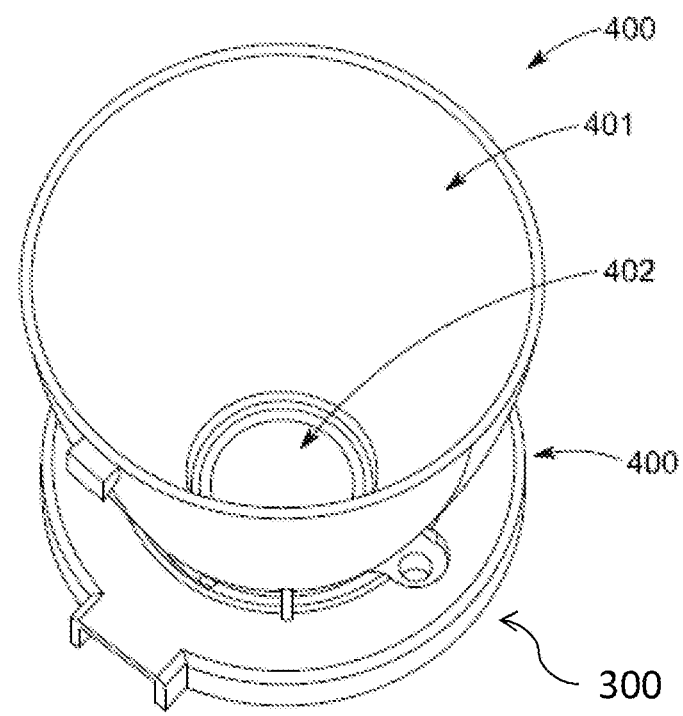
FIG. 4A is a top perspective view of an example reflector mated with the LED device holder of FIG. 3A.
Figure 4B:
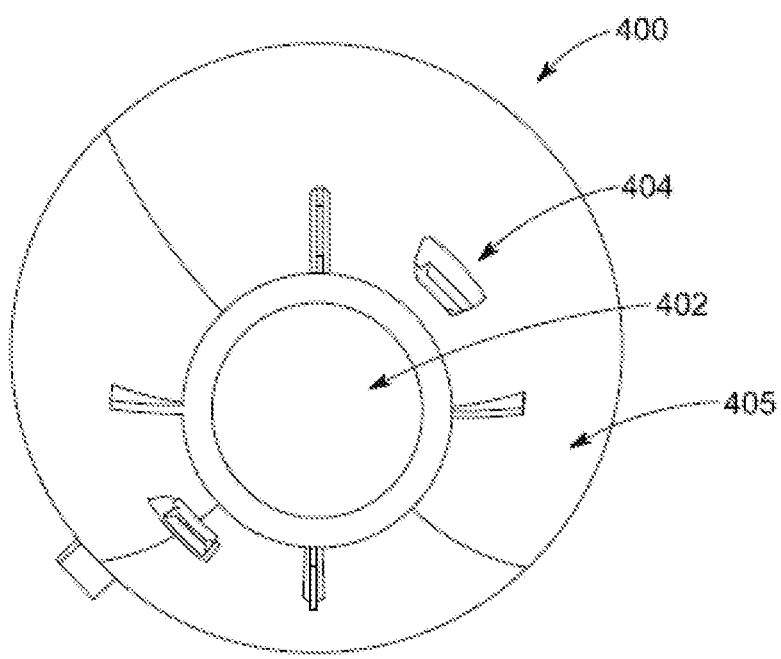
FIG. 4B is a bottom perspective view of the reflector of FIG. 4A.

As mentioned above, the secondary optics in an LED lighting system may include an aperture and a reflector. FIGS. 4A and 4B illustrate example LED lighting systems that include a reflector 400 disposed on top of the COB or other LED device and the LED device holder 300. The reflector 400 may concentrate a beam of light exiting the aperture 309. In embodiments, the reflector 400 may be formed from aluminum.

The illustrated reflector 400 has an opening 402 and curved sidewalls 401 that curve outwardly away from the opening 402. In embodiments, the reflector opening 402 is circular shaped. However, the opening 402 may have any suitable shape (e.g., based on a shape of the light emitting area of the COB or other LED device that is mechanically coupled to the LED device holder 300). At least a lower portion of the reflector 400 may be shaped to match the LED device holder 300. For example, at least the lower portion of the reflector may have approximately the same slope as the bevel portion 303 of the LED device holder 300 so as to allow the reflector to slide smoothly into the LED device holder 300.

In embodiments, the reflector opening 402 and the aperture 309 of the LED device holder 300 may have the same diameter and may be configured to align such that the light emitted from the light emitting area 102 may travel through the aperture 309 and the reflector opening 402. The curved sidewalls 401 of the reflector 400 may reflect light exiting the LED lighting system so that the light exiting the LED light system is concentrated to form a generally circular beam.

In the example illustrated in FIG. 3A, the bevel portion 303 of LED device holder 300 includes at least one slot 310. Further, in the example illustrated in FIG. 4B, the reflector 400 includes at least one tab 404 on an outer surface of the reflector sidewalls 401. The reflector tab 404 and the holder slot 360 may be located and sized to mate in a male-female fashion to join the LED device holder 300 and the reflector 400. In the embodiments illustrated in FIGS. 3A and 4B, two slots and two tabs are shown. However, one of ordinary skill in the art will understand that more or less tabs and slots may be included consistent with the embodiments described herein.

In another embodiment (not shown), at least one slot may be provided in the reflector sidewalls 401 and at least one tab may be provided on the bevel portion of the LED device holder 300. The slots and tabs may be located and sized to mate in a male-female fashion to join the LED device holder 300 and the reflector 400.

As mentioned above, the radius of the fillet can be optimized to, for example, optimize the efficiency of the LED lighting system. Methods for optimizing the radius of the fillet shape are described below. While one specific example is described, one of ordinary skill in the art will recognize that the methods can be used to optimize the radius of the fillet for any type of COB or other LED device having an array of densely packed light emitting elements.

Figure 5:
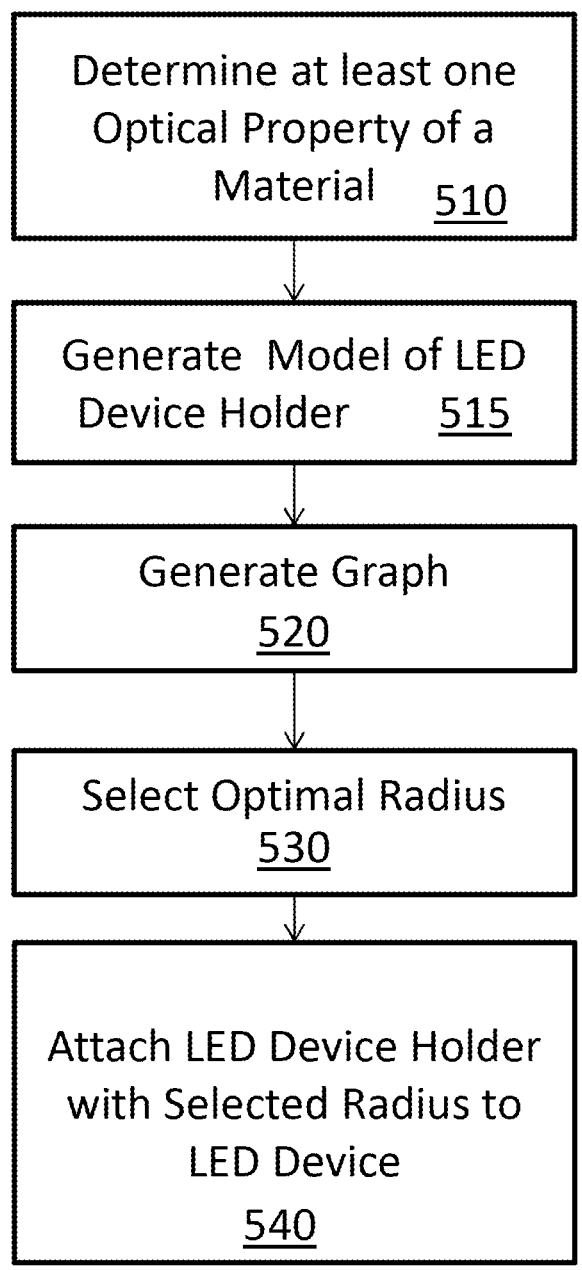
FIG. 5 is a flow diagram of an example method of manufacturing an LED lighting system.

FIG. 5 is a flow diagram 500 of an example method of manufacturing an LED lighting system. In the example illustrated in FIG. 5, the method includes determining at least one optical property of a material (510). The at least one optical property may be, for example, at least one of the reflectivity and refractivity of the material. In embodiments, the reflectivity or refractivity of the LED device holder may be measured. This may be done using, for example, any type of suitable sensor, such as integrating spheres, which may or may not be communicatively coupled to a computer system. In other embodiments, the optical property of the material may be entered as a user input into a computer system via a user interface or may already be pre-programmed into the computer system and/or software. For example, software and/or hardware may provide a graphic user interface (GUI) through which a user may select a material, and various optical properties of that material may already be known by the software and/or hardware.

A model of an LED device holder may be generated (515). The generated model may be a computer-generated model. The model of the LED device holder may include an aperture and a fillet adjacent the aperture. The fillet may have a radius. In embodiments, an LED device holder may be measured and a computer-generated model may be generated based on the measurements (e.g., using a coordinate-measuring machine (CMM)). In other embodiments, a user may provide inputs to the computer system via one or more user inputs that may enable the computer system to generate and display the model.

Using the optical property and the generated model, a graph may be generated (520), for example, by increasing a value for the radius of the fillet and plotting the efficiency of the LED lighting system for each radius value up to a maximum efficiency. This may be done, for example, by generating a computer model of the lighting system including the LED device holder and selected LED array and running simulations for each radius value. If desired, the simulation can be run based on materials with different optical properties. Example graphs for the Lumileds CoB Gen are provided in FIGS. 7-9 and described in detail below.

An optimal radius may be chosen (530) based on the generated graph (or graphs). For example, a radius corresponding to the maximum efficiency or an optimal efficiency taking into account other competing considerations if necessary or desired may be chosen. In embodiments, the selection may be made by a user looking at the graph displayed on a display, and the user may choose a radius that intersects with the most optimal output characteristic(s) of the LED lighting system (e.g., maximum system efficiency). In other embodiments, the computer system may select a radius based on criteria entered by a user using a user interface or pre-programmed and stored in storage or memory.

An LED device holder that is formed from the selected material and that has a fillet with the selected radius may be attached to an LED array (540). The LED device holder formed from the selected material and having the selected radius may be manufactured, obtained or otherwise selected. If the LED device holder is manufactured, it may be manufactured using an automated fabrication system, such as one communicatively coupled to the same or different computer system that was used to generate the graph. In other embodiments, the LED device holder may be manufactured using any suitable method, device or system, including preparing different portions of the LED device holder using different methods, devices and/or systems and then assembling them to form an LED device holder.

Figure 6:
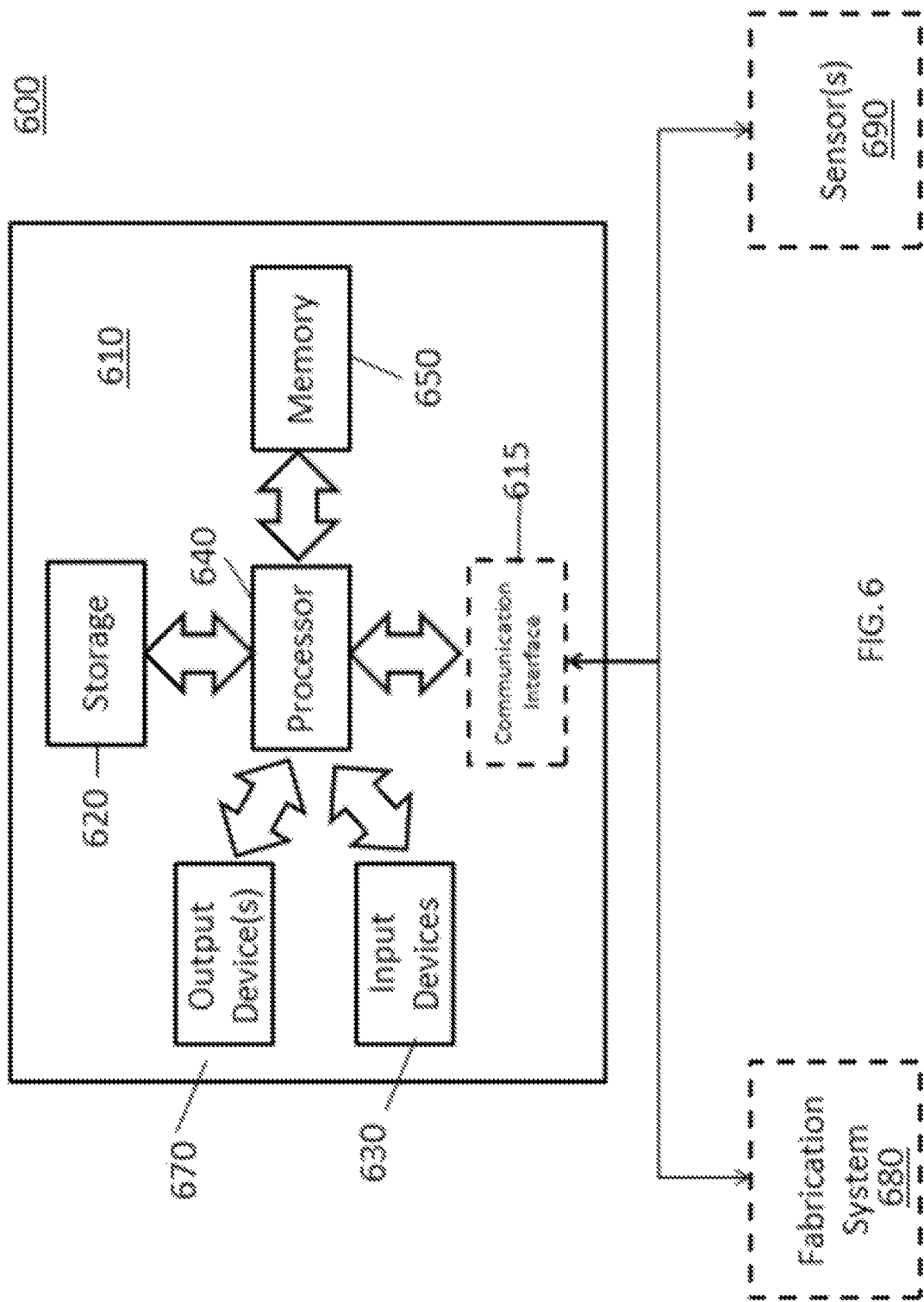
FIG. 6 is a diagram of an example system that may be used to implement all or some of the method of FIG. 5.

FIG. 6 is a diagram of an example system 600 that may be used to implement all or some of the method of FIG. 5. The system 600 may be, for example, a personal computer, a handheld device, optionally a personal computer or handheld device communicatively coupled to one or more sensors, or optionally an automated assembly system. In the example illustrated in FIG. 6, the system 600 includes a computer system 615 that may include a processor 640, a memory 650, storage 620, one or more input devices 630, one or more output devices 670, and an optional communication interface 615. The computer system 610 may also optionally include an input driver and an output driver (not shown) that drive the one or more input devices 630 and one or more output devices 670. The optional communication interface 615 may be communicatively coupled to one or more sensors 690 and/or a fabrication system 680 in some embodiments. One of ordinary skill in the art will understand that system 600 may include additional components not shown in FIG. 6.

The processor 640 may include a central processing unit (CPU), a graphics processing unit (GPU), a CPU and GPU, and/or one or more processor cores. The memory 650 may include a volatile or non-volatile memory, for example, random access memory (RAM), dynamic RAM, or a cache. The storage 620 may include a fixed or removable storage, for example, a hard disk drive, a solid state drive, an optical disk, or a flash drive. The one or more input devices 630 may include, for example, a keyboard, a keypad, a touch screen, a touch pad, a detector, a microphone, an accelerometer, a gyroscope, a biometric scanner, and/or a network connection (e.g., a wireless local area network card for transmission and/or reception of wireless IEEE 802 signals). The one or more output devices 670 may include, for example, a display, a speaker, a printer, a haptic feedback device, one or more lights, an antenna, and/or a network connection (e.g., a wireless local area network card for transmission and/or reception of wireless IEEE 802 signals).

The optional input driver may communicate with the processor 640 and the input devices 630 and enable the processor 640 to receive input from the input devices 630. The optional output driver may communicate with the processor 640 and the output devices 670 and enable the processor 640 to send output to the output devices 630. As the input driver and the output driver are optional components, the computer system 610 will operate in the same manner if the input driver and the output driver are not present.

The communication interface 615 may be any device capable of receiving inputs from, and providing outputs to, peripheral devices. In embodiments, the communication interface may one or a combination of a modem, wireless router, or USB connector.

The one or more sensors 690 may be any type of sensor and, in particular, may be sensors used to measure the reflectivity of the LED device holder, such as a spectrometer. In such embodiments, the computer system 610 may control the sensors to measure the reflectivity of the LED device holder and provide the measurement to software running on the computer system 610 that may generate one or more graphs, such as mentioned above and described below in detail. In other embodiments, the sensors may be user operated and configured just to provide measurements to the computer system 610 without control by the computer system 610.

The fabrication system 680 may be used to automate the entire manufacturing process for the LED device holder, if desired. As such, the fabrication system 680 may include any number of different components including robotic controls, robotic arms, gripping tools, conveyor belts, software, hardware and any other component used to manufacture the LED device holder under control of the computer system 610. As mentioned above, the fabrication system is not required, and one of ordinary skill in the art would recognize that the computer system 610 may be used to generate and display the one or more graphs and the remaining portions of the methods described herein may be performed using any number of different manufacturing techniques, which may include some automated processes, some human implemented processes, or some combination thereof.

Figure 7:
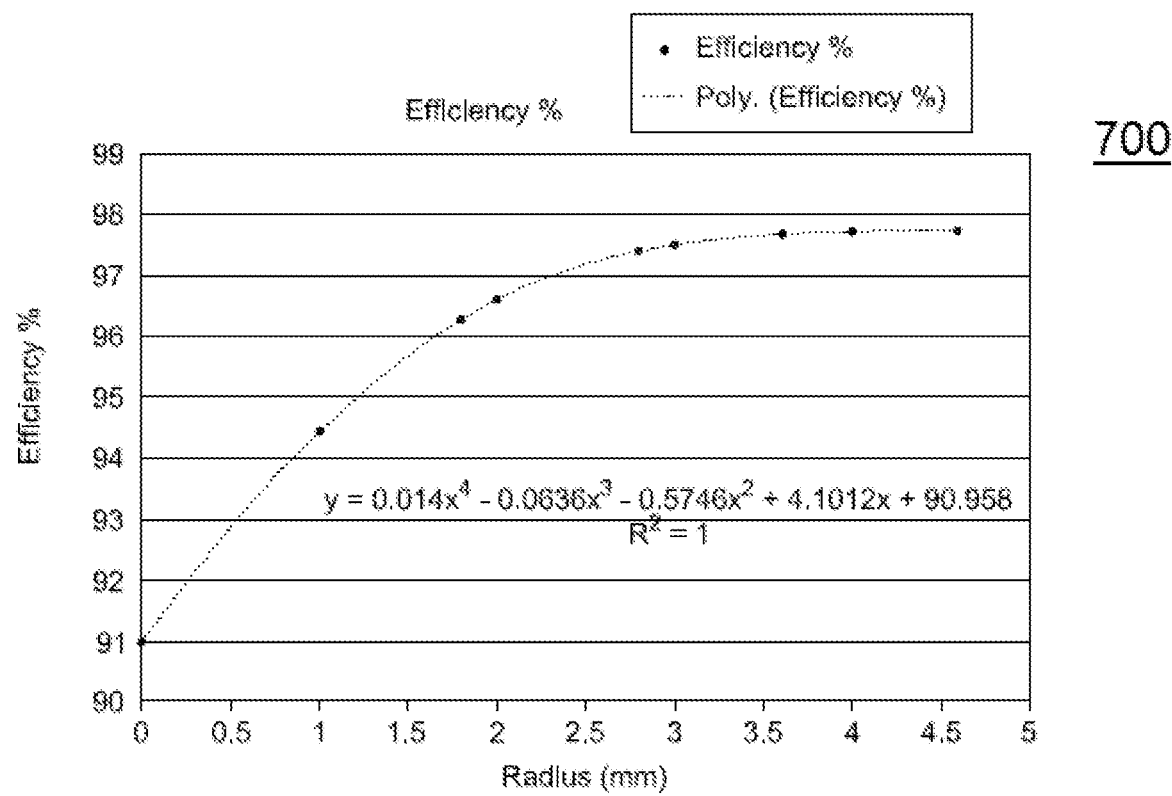
FIG. 7 is a graph of LED lighting system efficiency v. fillet radius for an LED lighting system incorporating the example LUMILEDS® CoB Gen 3 (e.g., L2C5-22901208E1500) 3610 lm LED and an LED device holder with increasing fillet radius.

FIG. 7 is a graph 700 of LED lighting system efficiency v. fillet radius for the example Lumileds CoB Gen described above. The measured diffuse reflectivity of the LED device holder, in this example, was 79% in 550 nm. As shown in the graph 700, for an LED lighting system using the LED device holder 200 (e.g., fillet radius=0 mm), the system efficiency is approximately 91%. For the LED device holder 300 with an inner portion 306 having a fillet radius greater than 0 mm and equal to or less than 4.6 mm, the efficiency increases with incremental increases in the fillet radius up to a maximum of approximately 4.6 mm. When the fillet radius of the inner portion 306 of holder 300 is 4.6 mm, the efficiency of the LED lighting system is approximately 97.7%. Accordingly, in this example, 4.6 mm would be chosen as the fillet radius for the inner portion of the LED device holder and may result in an increase in the overall LED lighting system efficiency of approximately 6.7%.

FIGS. 8A, 8B, 8C and 8D are graphs showing output flux, maximum intensity and full width at half maximum (FWHM) data for incremental increases of the fillet radius for the Lumileds CoB Gen example. In embodiments, one or more of these graphs may alternatively or additionally be used to select the optimal radius of the fillet.

Figure 8A:
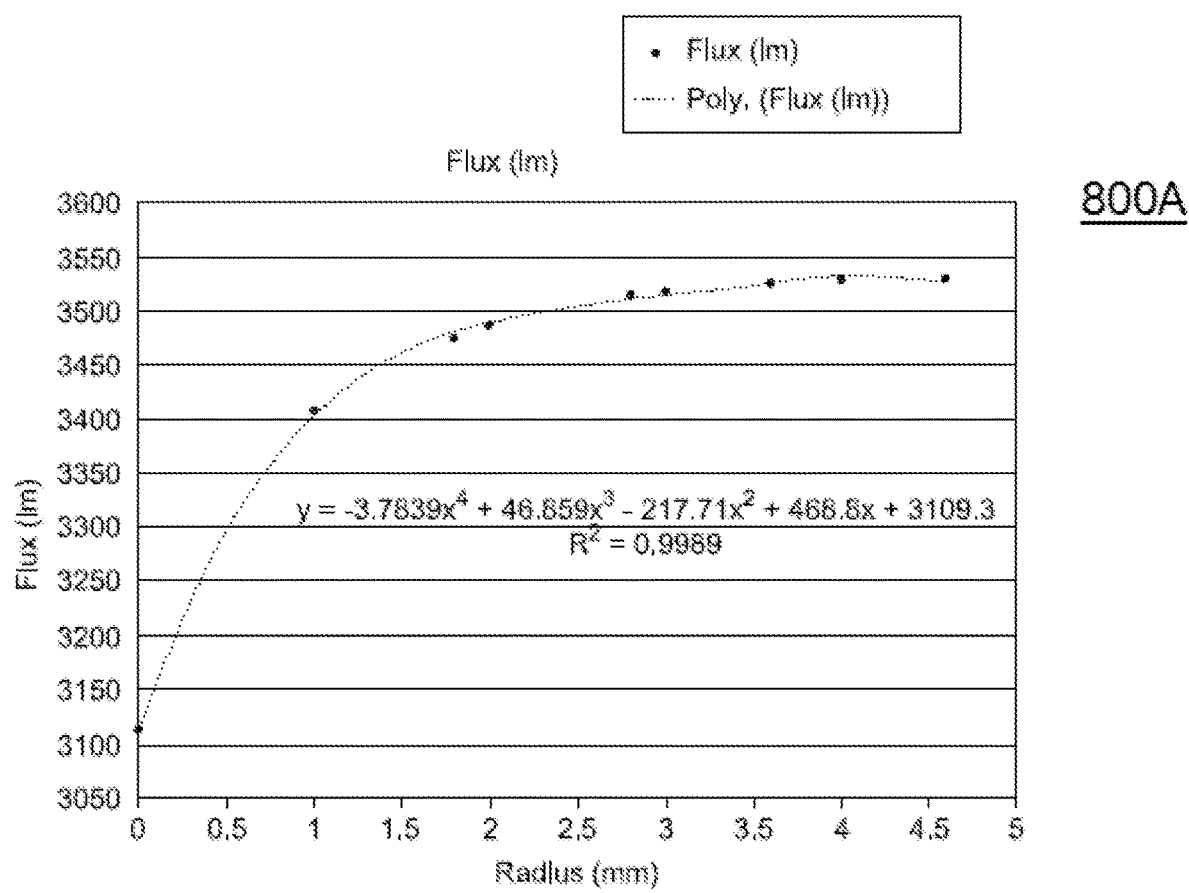
FIG. 8A is a graph of flux versus fillet radius for an LED lighting system incorporating the example LUMILEDS® CoB Gen 3 (e.g., L2C5-22901208E1500) 3610 lm LED and an LED device holder with increasing fillet radius.

As illustrated in the graph 800A of FIG. 8A, the flux increases as the fillet radius is increased from 0 mm to approximately 4.6 mm. For example, when the fillet radius 316 of inner portion 306 of the LED device holder 300 is 4.6 mm, the flux increases by 11% as compared to the LED device holder 200 with the inner portion 201 having a fillet radius of 0 mm.

Figure 8B:
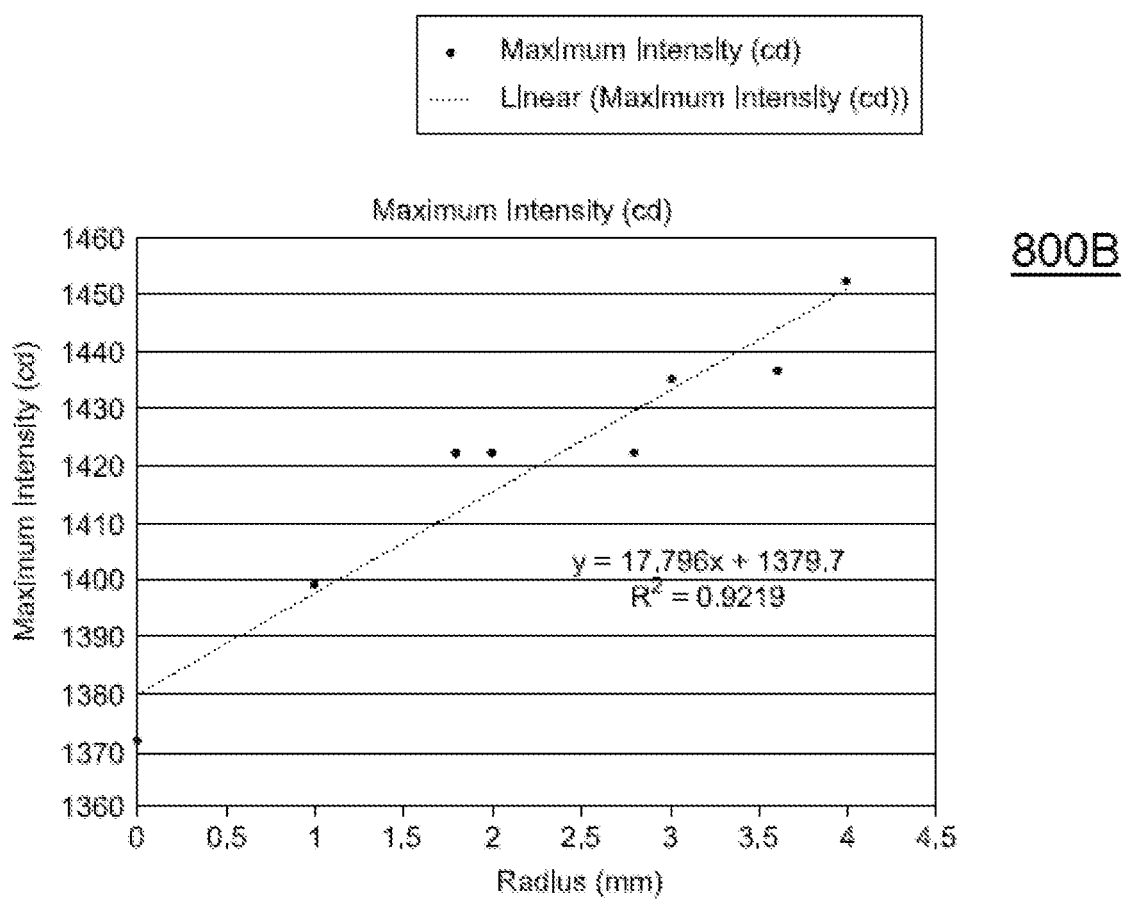
FIG. 8B is a graph of maximum intensity versus fillet radius for an LED lighting system incorporating the example LUMILEDS® CoB Gen 3 (e.g., L2C5-22901208E1500) 3610 lm LED and an LED device holder with increasing fillet radius.

As illustrated in the graph 800B of FIG. 8B, the maximum intensity increases as the fillet radius is increased from 0 mm to approximately 4.6 mm. For example, when the fillet radius 316 of the inner portion 306 of LED device holder 300 is 4.6 mm, the maximum intensity increases by 5.4% as compared to the LED device holder 200 with the inner portion 201 having a fillet radius of 0 mm.

Figure 8C:
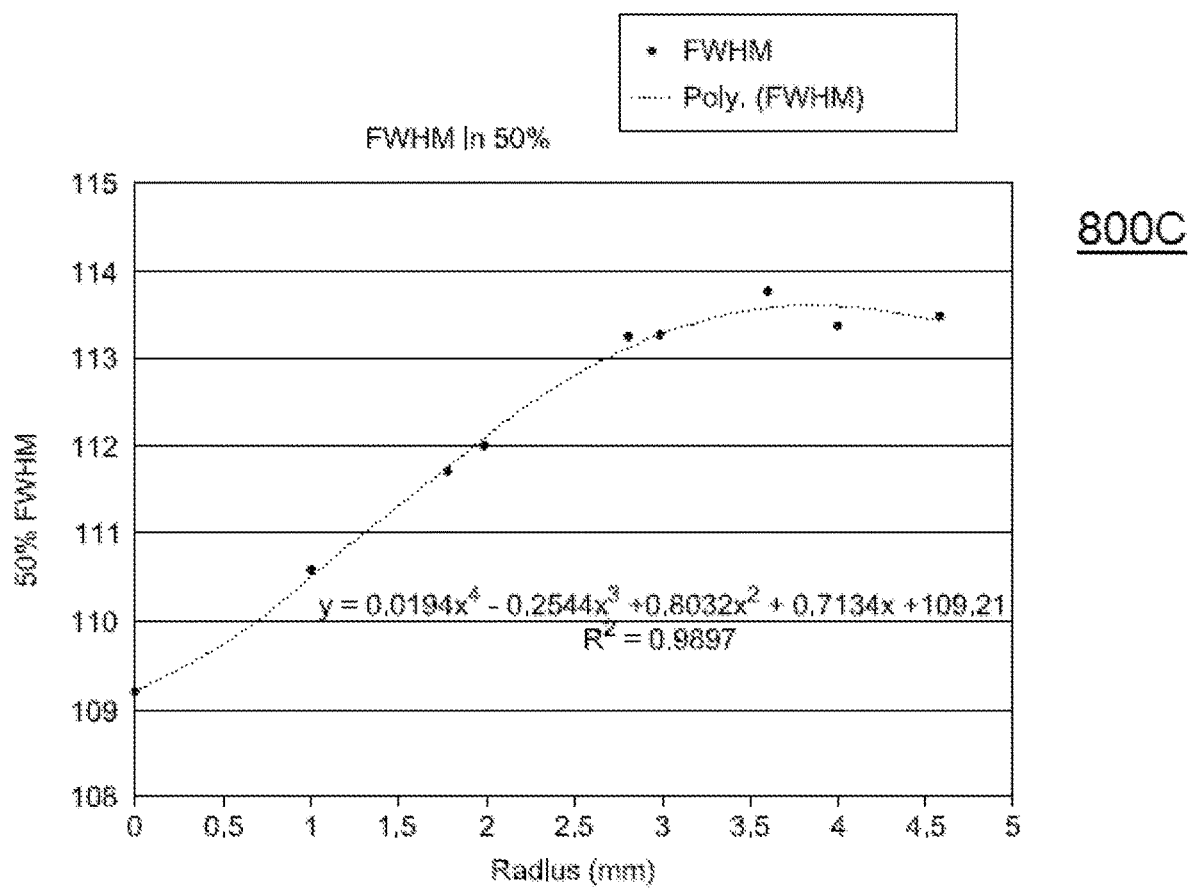
FIG. 8C is a graph of full width at half maximum (FWHM) versus fillet radius an LED lighting system incorporating the example LUMILEDS® CoB Gen 3 (e.g., L2C5-22901208E1500) 3610 lm LED and an LED device holder with increasing fillet radius.

As illustrated in the graph 800C of FIG. 8C, the full width at half maximum (FWHM) increases as the fillet radius is increased from 0 mm to approximately 4.6 mm. For example, when the fillet radius 316 of inner portion 306 of the LED device holder 300 is 4.6 mm, the FWHM increases by approximately 5.4% as compared to the LED device holder 200 with the inner portion 201 having a fillet radius of 0 mm.

Figure 8D:
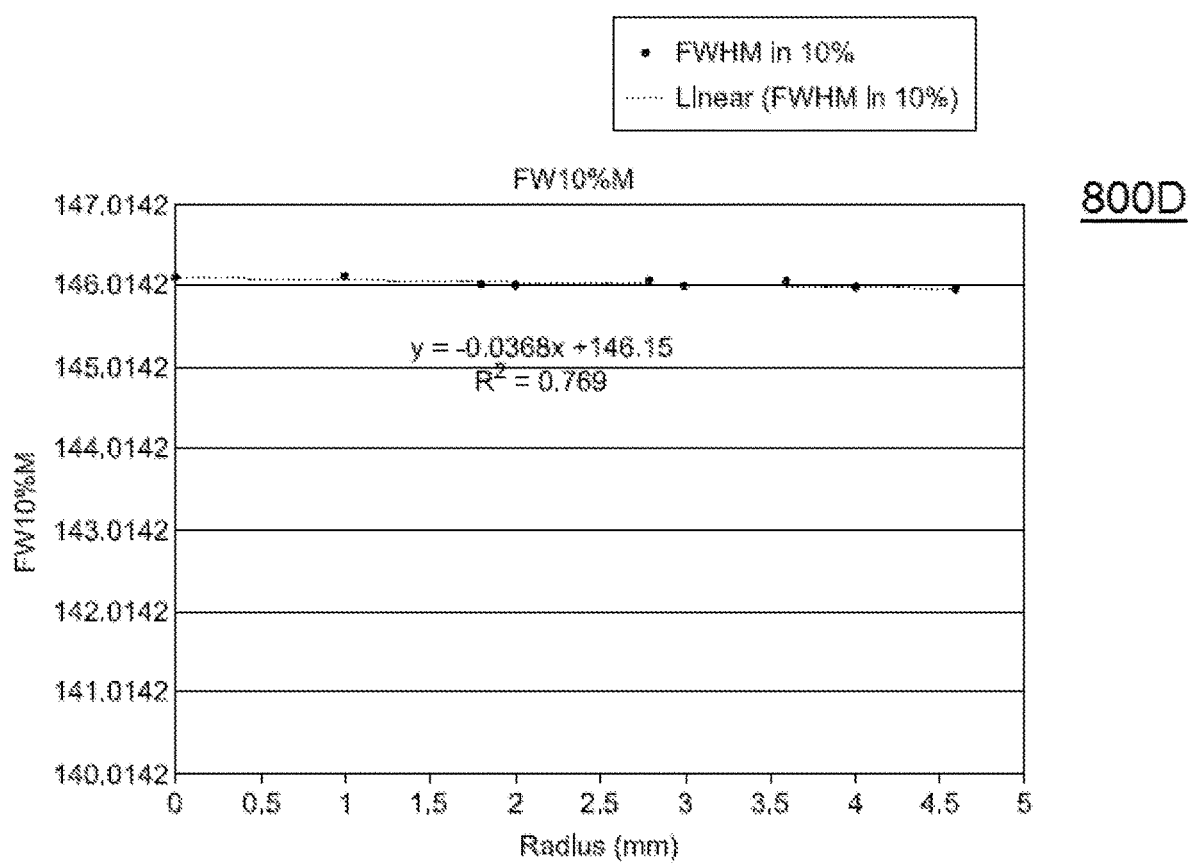
FIG. 8D is a graph of FWHM at 10% (FW10% M) versus fillet radius an LED lighting system incorporating the example LUMILEDS® CoB Gen 3 (e.g., L2C5-22901208E1500) 3610 lm LED and an LED device holder with increasing fillet radius.

As illustrated in the graph 800D of FIG. 8D, the FWHM at 10% (FW10% M) remains relatively constant as the fillet radius is increased from 0 mm to approximately 4.6 mm. Thus, the fillet radius has minimal impact on FW10% M of the example LED device system.

Figure 9A:
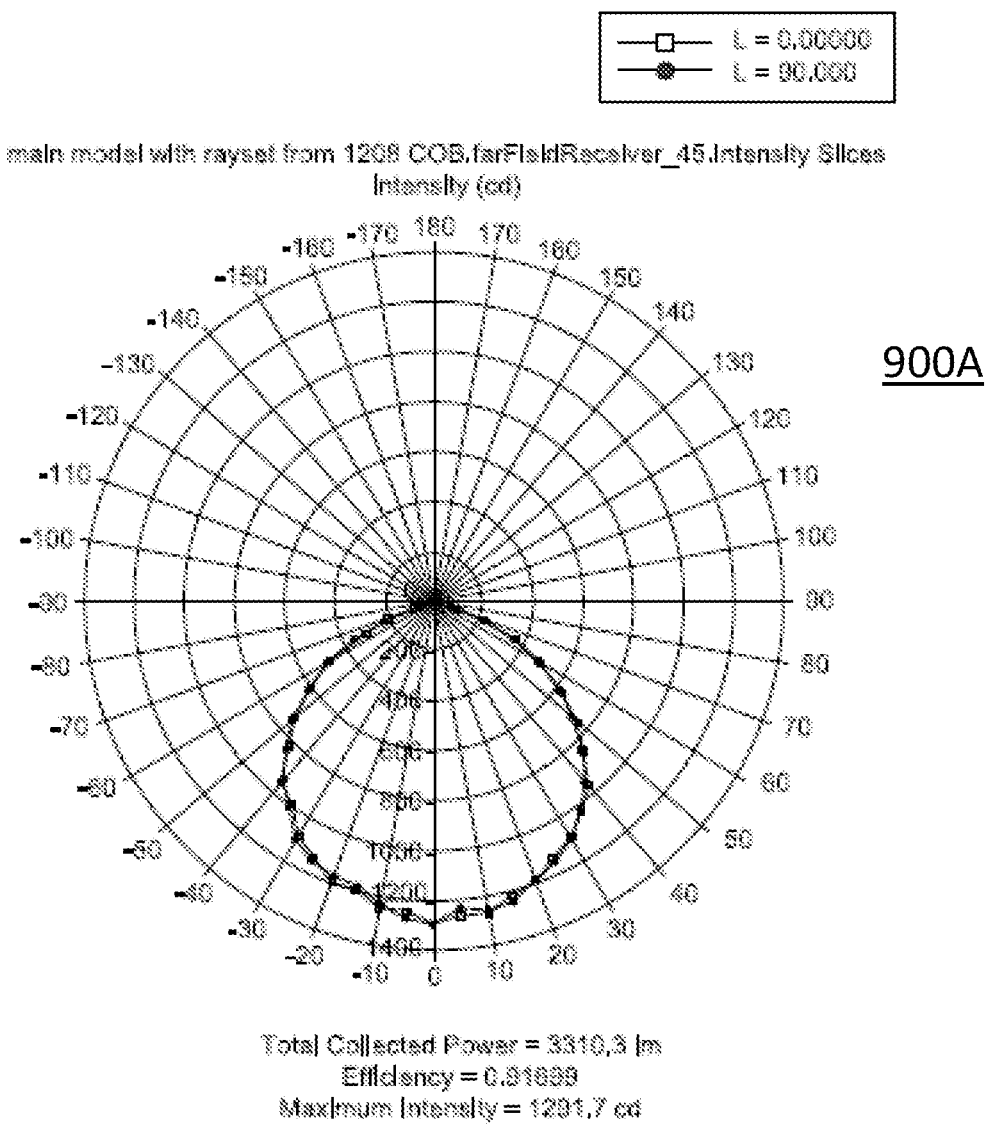
FIG. 9A is a diagram of the far field intensity radiation pattern of an LED lighting system incorporating the example LUMILEDS® CoB Gen 3 (e.g., L2C5-22901208E1500) 3610 lm LED and the LED device holder with fillet radius=0 mm.
Figure 9B:
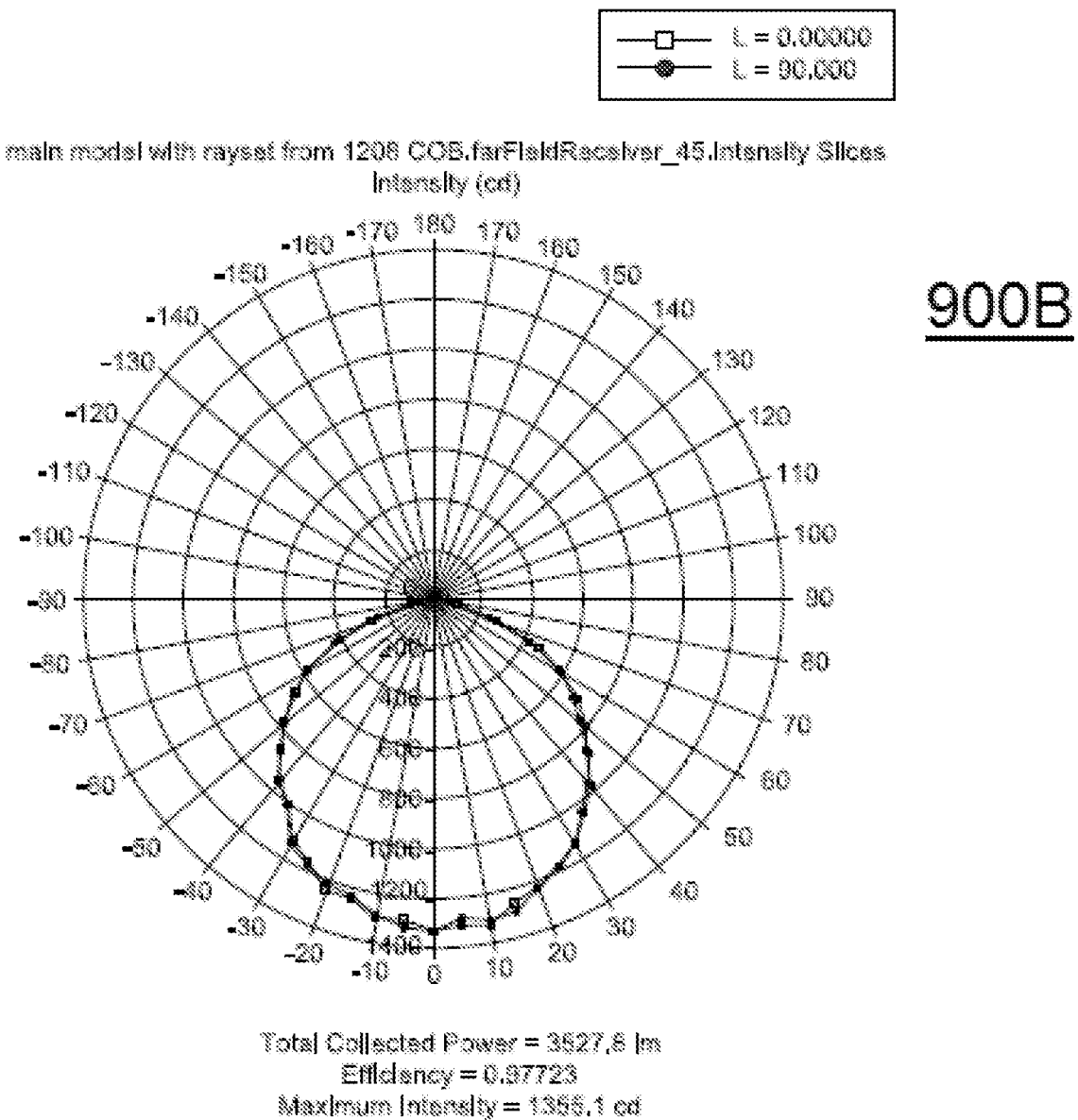
FIG. 9B is a diagram of the far field intensity radiation pattern of an LED lighting system incorporating the example LUMILEDS® CoB Gen 3 (e.g., L2C5-22901208E1500) 3610 lm LED and the LED device holder with the selected fillet radius of 4.6 mm.

FIG. 9A is a diagram 900A of the far field intensity radiation pattern of an LED lighting system incorporating the Lumileds CoB Gen LED device and the LED device holder 200 (e.g., fillet radius=0 mm). FIG. 9B is a diagram 900B of the far field intensity radiation pattern of an LED lighting system incorporating the Lumileds CoB Gen LED device and the LED device holder 300 with the selected fillet radius of 4.6 mm. As can be seen by comparing the diagrams illustrated in FIGS. 9A and 9B, the total power, system efficiency and maximum intensity are improved for the LED lighting system using the LED device holder 300 with the selected fillet radius of 4.6 mm.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light-emitting diode (LED) lighting system comprising:
    a holder comprising:
        an aperture having a perimeter, and
        a fillet adjacent the perimeter of the aperture, the fillet having a radius greater than or equal to 2.0 mm and less than or equal to 4.6 mm; and
    an LED array mechanically coupled to the holder, the LED array having a light emitting area exposed through the aperture.

2. The LED lighting system of claim 1, wherein the LED array is a chip on board (COB) LED device.

3. The LED lighting system of claim 2, wherein:
    the COB LED device comprises the LED array on a substrate,
    the LED array forms the light emitting area, and
    the holder is disposed over the COB LED device such that the light emitting area aligns with the aperture.

4. The LED lighting system of claim 3, wherein the aperture and the light emitting area are circular shaped.

5. The LED lighting system of claim 4, wherein a diameter of the light emitting area is greater than or equal to 15.0 mm and less than or equal to 32.0 mm, and the radius of the aperture is 4.6 mm.

6. The LED lighting system of claim 4, wherein a diameter of the light emitting area is greater than or equal to 6.0 mm and less than or equal to 15.0 mm.

7. The LED lighting system of claim 1, further comprising a reflector mechanically coupled to the holder over the LED array.

8. The LED lighting system of claim 7, wherein the reflector has an opening aligned with the aperture and curved sidewalls that extend from the opening.

9. A light emitting diode (LED) device holder comprising:
    an outer section; and
    an inner section mechanically coupled to the outer section, the inner section defining an aperture having a perimeter, a portion of the inner section adjacent the aperture having a fillet shape with a radius greater than or equal to 2.0 mm and less than or equal to 4.6 mm.

10. The LED device holder of claim 9, further comprising a bevel portion that mechanically couples the outer section to the inner section.

11. The LED device holder of claim 10, wherein the bevel portion comprises at least one slot for receiving a reflector.

12. The LED device holder of claim 9, wherein the outer section has an outer wall and a top surface, the inner section has a top surface and a bottom surface, and the top surface of the inner section is lower than the top surface of the outer section.

13. The LED device holder of claim 12, wherein the bottom surface of the inner section defines the aperture.

14. The LED device holder of claim 9, further comprising a plurality of mounts each having an opening configured to accommodate a mechanical fastener.

15. The LED device holder of claim 9, wherein a diameter of the aperture is greater than or equal to 15.0 mm and less than or equal to 32.0 mm and the radius of the fillet is 4.6 mm.

16. The LED device holder of claim 9, wherein a diameter of the aperture is greater than or equal to 6.0 mm and less than or equal to 15.0 mm.

17. A method of manufacturing a light emitting diode (LED) lighting system, the method comprising:
    determining at least one optical property of a material;
    generating a model of an LED device holder comprising an aperture having a perimeter and a fillet adjacent the perimeter of the aperture, the fillet having a radius;
    using the at least one optical property and the generated model to generate a graph of system efficiency for increasing values of the radius of the fillet;
    selecting a value from the graph that corresponds to the most optimal system efficiency; and
    attaching an LED device holder formed from the material and having a fillet with a radius of the selected value to an LED array.

18. The method of claim 17, further comprising displaying the generated graph on a display.

19. The method of claim 18, wherein the selecting comprises one of a user selecting the value corresponding to a point on the graph where the selected value of the radius intersects with a maximum system efficiency and a computer system selecting the value based on user entered or preprogrammed criteria.

20. The method of claim 17, wherein the at least one optical property is one of reflectivity and refractivity.

* * * * *